July 7, 1925.  1,545,301
H. G. BARTHOLOMEW ET AL
TELEGRAPHY COMBINED WITH PHOTOTELEGRAPHY OR TELAUTOGRAPHY
Filed Jan. 19, 1925
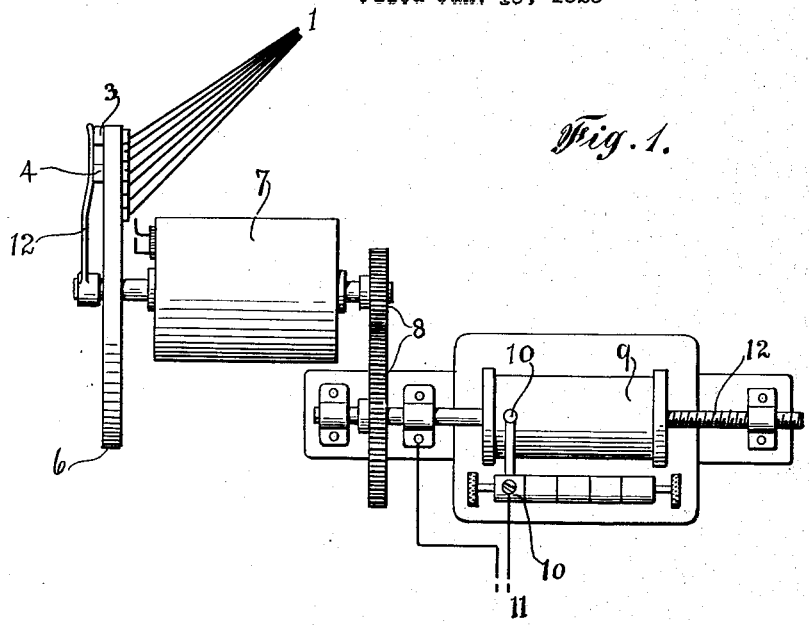
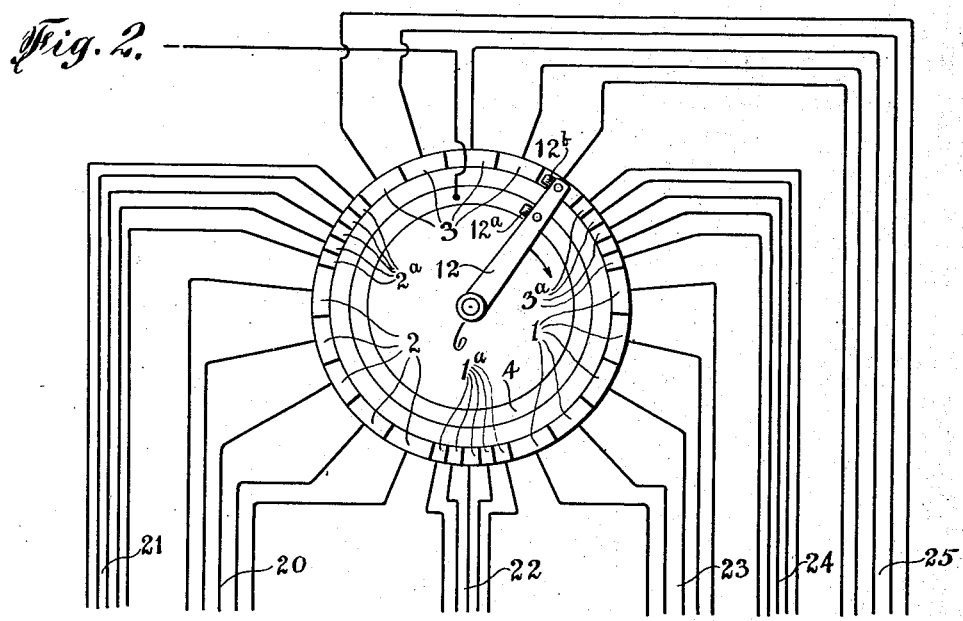
Harry Guy Bartholomew
Maynard Leslie &c. McFarlane
INVENTORS
BY Marks & Clerk
ATTORNEYS Patented July 7, 1925.

1,545,301

UNITED STATES PATENT OFFICE.

HARRY GUY BARTHOLOMEW AND MAYNARD L. D. McFARLANE, OF LONDON, ENGLAND.

TELEGRAPHY COMBINED WITH PHOTOTELEGRAPHY OR TELAUTOGRAPHY.

Application filed January 19, 1925. Serial No. 3,496.

*To all whom it may concern:*

Be it known that we, HARRY GUY BARTHOLOMEW, a subject of the King of Great Britain and Ireland, and residing at 23–29 Bouverie Street, London, E. C. 4, England, and MAYNARD LESLIE DEEDES McFARLANE, a subject of the King of Great Britain and Ireland, and residing at 162 Haverstock Hill, London, N. W. 3, England, have invented certain new and useful Improvements in and Relating to Telegraphy Combined with Phototelegraphy or Telautography, of which the following is a specification.

This invention relates to telautography or phototelegraphy.

In connection with telegraphy it has been proposed simultaneously to transmit messages by means of positive and negative currents and by means of telephone currents; also to transmit messages simultaneously by means of direct currents and alternating or oscillatory currents.

Further, it has been proposed to transmit a number of series of electrical impulses simultaneously and to receive these signals as audible signals by means enabling the signals of each series to be differentiated from the signals of the other series.

One object of the present invention is to provide improvements in telautography or photo-telegraphy and more particularly in the method of telautography or photo-telegraphy in which a visual representation is operated upon my means adapted to produce signals such as claimed in the specification of U. S. Patent 1,454,719, granted to one of us.

A further feature of the invention resides in a novel method of arranging the transmitting means forming part of the multiplex system so that one of the channels will transmit a larger number of signals than in standard practice. For instance one of the channels of a quadruplex machine comprising four channels designed to transmit five signals each or 20 signals in all may be arranged to transmit fifteen signals, through three channels in the usual manner while one channel is utilized to transmit a visual representation.

By this means the speed of transmission of such a visual representation may be materially increased. Such increased speed in the transmission of the visual representation is practicable because errors due thereto in the signals representing the tones do not introduce errors of a serious character.

This phase of the invention may be employed both in connection with telegraphy combined with photo-telegraphy or photo-telegraphy alone, telephonic currents being employed, for instance, in the transmission of the tones of the original representation to be transmitted, in which case the messages sent by positive and negative currents may serve the purpose of securing synchronism.

To provide a convenient arrangement of the transmitting means to avoid the disadvantage of running the recording device for a relatively long period at one rate while receiving the messages and at a very much higher rate for a short period while receiving the visual representation, we prefer to arrange the connections to the channel for transmission of said visual representation alternately with those for the transmission of messages, as for instance in the arrangement of quadruplex system suggested, in groups of five, i. e. a group of five connections to transmit five messages through one of the three message channels of the system alternating with a group of five connections transmitting a visual representation through the one channel used for transmitting visual representations.

The present invention comprises simultaneously transmitting over a common metallic conductor signals or sounds of the usual character whether telegraphic or telephonic and simultaneously transmitting over said common conductor signals representing a picture by telephonic, oscillator, or alternating currents.

Fig. 1 is a plan view showing a picture transmitting mechanism driven from the distributor of a multiplex system.

Fig. 2 is a detailed view of the receiving distributor, the "sixth pulse" and "corrector" segments being omitted as they may be arranged similarly to the segments shown.

In the circuits illustrated the message circuit may be an ordinary make and break (on and off) telegraph circuit while the picture circuit can be a make and break circuit or a modulated circuit or may be a circuit of constant amplitude but varying frequency, dependent on the form of picture machine used.

The invention is not restricted to the use of any particular form of picture machine, and for the purposes of the invention the multiplex systems shown could be replaced by single-channel synchronous telegraph apparatus, such as the Siemens or Creed.

In Fig. 1, 1 indicates the leads from the commutator 6 of a multiplex system to the transmitters or printers of the system, 4 is a solid ring while 3 represents the divided segments communicating with the separate channels of the system, one of which may be used for instance for telegraph signals, another for telephone signals and a third for sending messages by means of an oscillating circuit, while 6 indicates the distributing disk of the picture and telegraph circuits, 8 indicates the gearing connecting the distributor 7 and the picture transmission apparatus which comprises a cylinder 9 carrying the representation to be transmitted, 10 is a stylus, 12 a threaded spindle serving to feed the representation across the stylus, and 11 the leads of the picture circuit.

In Fig. 2, the segments serving to transmit the picture signals to or from the line are shown at 1ª, 2ª, 3ª. It will be observed that these segments are much shorter than the message segments 1, 2, 3, being formed by dividing up the fourth segment of a four channel commutator into three segments arranged between the message segments, 12 indicates the commutator arm with wire brushes 12ª, 12ᵇ, 21 indicates the leads to picture channel 2ª, 20 the leads to message channel 2, 22 the leads to picture channel 1ª, 23 the leads to message channel 1, 24 the leads to picture channel 3ª, and 25 the leads to message channel 3.

In Fig. 3, 13 indicates an oscillating circuit, the messages from which are put on the main lines through a filter in the usual manner, 15 and 16 indicating telephone and D. C. telegraph circuits respectively, while 14 indicates the leads from a picture circuit, the signals of which are impressed on the oscillating circuit 27 and put on the main line through filter 28.

The transmitting means or commutator forming part of the multiplex system may, for the purpose of the present invention, be so arranged that the picture channel, as it may be called, will transmit a larger number of signals than in standard practice. For instance, this channel of a multiplex machine comprising four channels designed to transmit five signals each may be divided to transmit fifteen signals, the three channels remaining unaltered being utilized to transmit ordinary message signals in the usual manner while the subdivided channel is utilized to transmit the signals enabling a visual representation of a subject to be reproduced at the receiving station.

By this means the speed of transmission of such a visual representation may be materially increased. Such increased speed in the transmission of the visual representation is practicable because slight errors due thereto in the signals representing the tones do not introduce errors of a serious character.

The signals are conveniently employed in the formation of intermediate records of any suitable character. They may, for instance, be employed in forming intermediate records in the form of punched or perforated tape. Thus, the intermediate records may be formed in the manner claimed in the specification of our copending application No. 572,664, the intermediate records being in such case in the form of a punched or otherwise marked band of material of a character adapted to be produced by an automatic telegraphic receiving machine, the intermediate record being then employed in the reproduction of a pictorial representation of the original in any suitable manner and in particular in any of the manners described, for instance, in the specification of British Letters Patent Nos. 166,917, U. S. 1,454,719, British 195,577, and U. S. application 572,664.

The method of carrying the invention into effect, when employing telephonic currents, will, as above stated, generally follow the method described and claimed in the specification of U. S. Patent No. 1,454,719. The telephonic currents received at the receiving station may be employed to operate a recorder of the dictaphone type, as described in the said specification, thus producing an intermediate record which in turn will be employed in reproducing a visual representation of a subject operated upon at the transmitting station.

We claim—

1. A system for the simultaneous transmission of pictures and messages over a multiplex system comprising message sending apparatus of the usual type in combination with apparatus acting to translate a pictorial representation into electrical signals and commutator means whereby a larger number of picture signals are sent through channels of said multiplex system than the number of ordinary message signals sent through the other channels of said system.

2. A system for the simultaneous transmission of pictures and messages over a multiplex system comprising message sending apparatus of a known kind in combination with apparatus acting to translate a pictorial representation into electrical signals and commutator means whereby a larger number of picture signals are sent through channels of said multiplex system than the number of ordinary message signals sent through the other channels of said system, the commutator being arranged to transmit said picture signals to the channel of the multiplex system reserved for said signals between the transmission to the line of the message signals from each of the usual sending apparatus associated with said line.

In testimony whereof we have signed our names to this specification.

HARRY GUY BARTHOLOMEW.
MAYNARD L. D. McFARLANE.